(12) United States Patent
de la Roij

(10) Patent No.: US 7,993,449 B2
(45) Date of Patent: Aug. 9, 2011

(54) BINDER COMPOSITION, A CONSTRUCTION COMPOSITON COMPRISING SAID BINDER COMPOSITION, AS WELL AS A METHOD FOR PREPARING THE CONSTRUCTION COMPOSITION AND USE THEREOF

(75) Inventor: Robin de la Roij, Moerdijk (NL)

(73) Assignee: Mega-Tech Holding B.V., Moerdijk (NL)

( * ) Notice: Subject to any disclaimer, the term of this patent is extended or adjusted under 35 U.S.C. 154(b) by 1052 days.

(21) Appl. No.: 11/704,942

(22) Filed: Feb. 12, 2007

(65) Prior Publication Data

US 2007/0215010 A1    Sep. 20, 2007

(30) Foreign Application Priority Data

Feb. 14, 2006   (NL) ...................................... 1031142

(51) Int. Cl.
*C04B 18/06* (2006.01)
*C04B 18/08* (2006.01)
(52) U.S. Cl. .................................. 106/705; 106/DIG. 1
(58) Field of Classification Search .................. 106/705, 106/DIG. 1
See application file for complete search history.

(56) References Cited

U.S. PATENT DOCUMENTS

| 4,240,952 | A | 12/1980 | Akinc et al. |
| 6,773,500 | B1 | 8/2004 | Creamer et al. |
| 2004/0050303 | A1 | 3/2004 | Barbour |

FOREIGN PATENT DOCUMENTS

| GB | 1069657 | * | 5/1967 |
| GB | 1 592 001 | | 7/1981 |
| GB | 1592001 A | * | 7/1981 |
| GB | 2 128 179 | | 4/1984 |
| JP | 04 305044 | | 10/1992 |
| JP | 11 092193 | | 4/1999 |
| WO | 02/48067 | | 6/2002 |
| WO | 2004/087600 | | 10/2004 |
| WO | 2005/087687 | | 9/2005 |

OTHER PUBLICATIONS

Data Base WPI, Section Ch, Week 1999834, Derwent Publications LTD, London, GB, Class L02, AN 1998-396820 XP002306623 (RU 2101251 C1 (Kansk-Achinsk Fuel Power Complex) Jan. 10, 1998 abstract only.*
Note: Documents above cited from International Search report for U.S. Appl. No. 10/592,367.*

* cited by examiner

*Primary Examiner* — Paul Marcantoni
(74) *Attorney, Agent, or Firm* — Young & Thompson

(57) ABSTRACT

A binder composition includes a) an ash, b) an additive composition, wherein the additive composition includes one or more components from group (b1) and one or more components from group (b2), wherein group (b1) consists of metal chlorides and wherein group (b2) consists of silica, zeolite and apatite, and c) a cement. In addition to that the present application relates to a construction composition including the present binder composition and a basic component, and also to a method for preparing the construction composition and to uses thereof.

14 Claims, 3 Drawing Sheets

BINDER COMPOSITION, A CONSTRUCTION COMPOSITON COMPRISING SAID BINDER COMPOSITION, AS WELL AS A METHOD FOR PREPARING THE CONSTRUCTION COMPOSITION AND USE THEREOF

BACKGROUND OF THE INVENTION

1. Field of the Invention

The present application relates to a binder composition comprising an ash, an additive composition and a cement. In addition to that the present application relates to a construction composition comprising a basic component and the present binder composition, and also to a method for obtaining the same and uses thereof.

2. Description of the Related Art

From WO 2005/087687 in the name of the present inventor there is known a construction composition comprising 90.0-99.9 wt. % ash, 0.1-10.0 wt. % additive composition comprising metal chlorides and silica, zeolite or apatite, and 0.0-5.0 wt. % cement. Such a composition is used for reusing large amounts of ash, for example in a construction composition for consolidating bottom materials. Such a composition is less suitable for particular structural and infrastructural applications, however.

From WO 2004/087600 there is known a cementitious composition comprising: a pozzolonic material; a compound comprising an alkaline earth metal; and a catalyst selected from the group consisting of an alkali-containing zeolite, an alkali-containing feldspathoid, and combinations thereof, said amount being sufficient to catalyze the pozzolonic reaction between the alkaline earth metal and the pozzolonic material; a sufficient amount of water to produce a cement product.

From GB 1592001 there is known a cement composition comprising a cementitious material, a pozzolan material, fine aggregate, water, at least one alkali metal constituent which is a sodium or potassium ion, and at least one anionic constituent which is a sulfate, chloride, bromide, or nitrite ion.

From GB 2128179 there is known a rapid setting and hardening hydraulic cement composition comprising hydraulic cement, fly-ash, an inorganic flocculant and water.

SUMMARY OF THE INVENTION

It is an object of the present invention to provide a binder composition which, when used in a construction composition, exhibits sufficient mechanical properties for use in structural and infrastructural applications.

Another object of the present invention is to provide a binder composition which, when used in a construction composition, is capable of trapping harmful compounds that are present in cement, such as chromium, iron and radon, so that said compounds cannot leak out and find their way into the environment.

In addition to that it is an object of the present invention to provide a binder composition which, when used in a construction composition, is capable of converting harmful hexavalent chromium into less harmful trivalent chromium.

One or more of the above objects is (are) achieved by a binder composition as referred to in the introduction, comprising:

a) an ash in an amount of 30.0-70.0 wt. %, based on the total weight of the binder composition;

b) an additive composition in an amount of 0.1-5.0 wt. %, based on the total weight of the binder composition, wherein the additive composition comprises one or more components from group (b1) and one or more components from group (b2), wherein group (b1) consists of metal chlorides and wherein group (b2) consists of silica, zeolite and apatite, and wherein the one or more components from group (b1) make up 70.0-99.0 wt. % of the total weight of the components (b1) and (b2) and wherein the one or more components from group (b2) make up 1.0-30.0 wt. % of the total weight of the components (b1) and (b2);

c) a cement in an amount of 25.0-69.9 wt. %, based on the total weight of the binder composition.

An advantage of such a binder composition is that the binder composition, when used in a construction composition, converts hexavalent chromium that is present in the composition into trivalent chromium, and that said chromium compounds, as well as any harmful radon that may be present in the composition, will not find their way into the environment (see the Examples). Such an advantage is achieved to a lesser extent, or even not at all, with a binder composition that comprises amounts of ash, additive composition and cement that do no fall within the scope of present invention.

Chromium (VI) compounds are very toxic because of their high oxidation potential and their ability to penetrate the human tissue and many are carcinogenic. Chromium (VI) compounds furthermore, have a high solubility in water, are highly mobile and leach out easily.

If component a) is present in the binder composition in an amount of less than 30.0 wt. %, less so-called primary resembling ettringites will be formed (which ettringites will be explained in more detail hereinafter), which inter alia adversely affects the durability. If the amount of component a) is larger than 70.0 wt. %, the structural quality of the final construction composition, using the present binder composition, will be insufficient for the intended applications.

If component b) is present in the binder composition in an amount of less than 0.1 wt. %, the binding effect thereof will be insufficient and insufficient ettringite will be formed. If the amount of component a) is larger than 5.0 wt. %, the binder composition will be too plastic, and the composition cannot be readily processed anymore.

If component c) is present in the binder composition in an amount of less than 25.0 wt. %, the structural quality of the final construction composition, using the present binder composition, will be insufficient for the intended applications. If the amount of component c) is larger than 69.9 wt. %, insufficient ettringite will be formed, which adversely affects the durability thereof.

BRIEF DESCRIPTION OF THE DRAWING FIGURES

The present invention will be elucidated further by means of preferred embodiments and figures, in which FIG. 1 shows a E-SEM picture of unstabilized sludge FIG. 2 shows a detail of FIG. 1

DETAILED DESCRIPTION OF THE INVENTION

Figure 1:
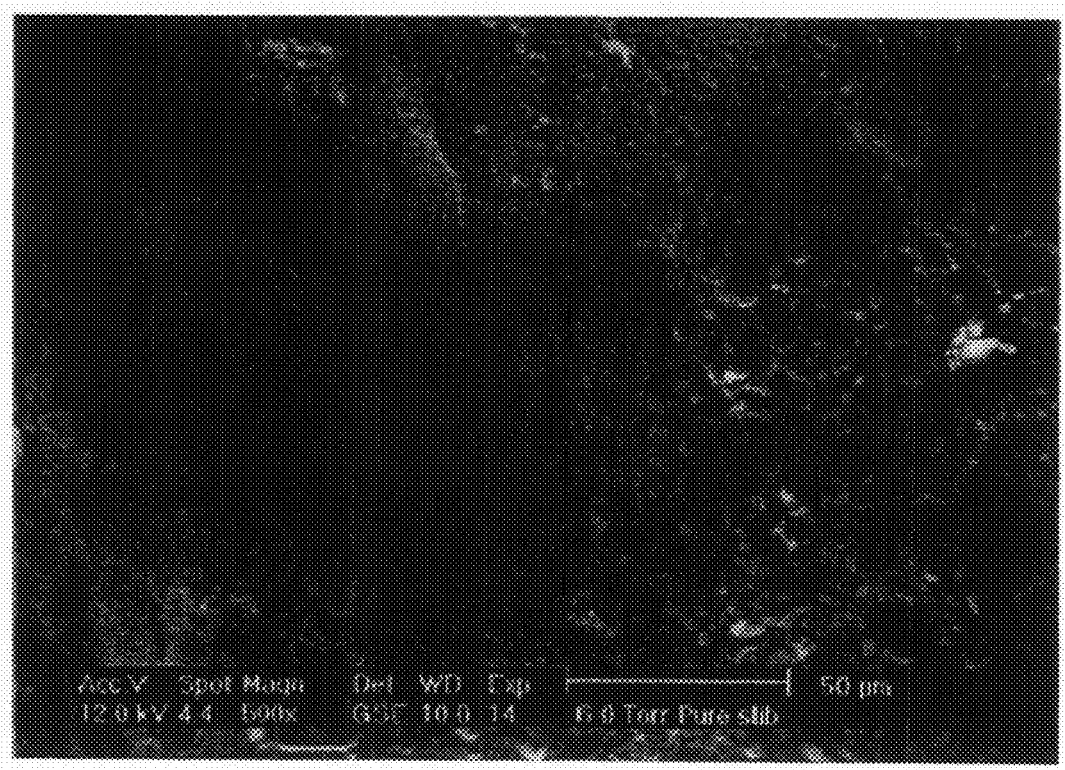

The term cement (component c)) is understood to refer to a salt hydrate consisting of a fine-ground material which, after mixing with water, forms a more or less plastic mass, which hardens both under water and in the outside air and which is capable of bonding materials suitable for that purpose to form a mass that is stable also in water. The cement standards according to European standard NEN-EN-197-1 are as follows: CEM I is Portland cement; CEM II is composite Portland cement; CEM III is blast furnace slag cement; CEM IV is puzzolane cement and CEM V is composite cement.

Clinker mineral is one of the components of cement, an example of a specific clinker mineral is the compound between calcium and aluminium, or tricalcium aluminate (C3A). Tricalcium aluminate reacts strongly with water and sulphate that is added to cement, often in the form of gypsum ($CaSO_4.2H_2O$) or anhydrite ($CaSO_4$), during which reaction ettringite is formed. Consequently the present binding agent will form ettringite when used in a construction composition in which it is exposed to water. The formation of ettringite may lead to a difference in the specific area of the cement mass en correspondingly to an increase in the reactive faces. The formation of ettringite at an early stage, i.e. during the first phase of hardening (dormant period) is also referred to as primary ettringite formation. Ettringite contributes to the formation of crystalline compounds in the matrix of the final construction material. As a result, the formation of ettringite contributes to the durability, because the durability is derived from the quality of the crystalline compounds that are formed in the matrix. The presence of primary ettringites will lead to improved constructional properties, such as the compression strength, the E-modulus, the splitting strength and the like.

The present inventor ascribes the excellent features of the present invention, without wishing to be bound by such a theory, to the surprising formation of long needle-like crystalline structures, which needle-like structures appear to form into cage-like structures during the hardening of the final construction composition.

Said cage-like structures appear to have a shape such that said structures are capable of trapping and containing harmful and/or contaminating atoms, ions and molecules, such as the poisonous chromium (IV) and the less harmful chromium (III), iron (III) and radon, by fixation through charge interaction and other chemical binding effects. This advantageous feature of the present invention is of major importance, as more and more countries are imposing increasingly stringent requirements as regards the standards for harmful substances that may be released from construction compositions. Thus, the standards imposed by South Africa in 2006 are more stringent than the standards in, for example, the USA, Europe and also Netherlands as regards the presence of hexavalent chromium. Consequently it is very important to obtain an optimum immobilization inter alia of chromium and radon, which appears to be surprisingly readily possible with the present binder composition and which so far has not been found possible to a sufficient extent with commercially available binder compositions up to now.

The cage structure allows the occlusion of atoms, ions and molecules having a specific size and charge. The actual chemical species that can pass into the cage structure is limited by both the cage dimensions and the size and possibly the shape of the chemical species. The factors which probably cause fixation of the chemical species within the cage structure are likely to be charge and bonding effects (ie referred to as molecular recognition or as chemical species recognition). The present additive composition has the ability to sequester ions in lattice positions into its network of channels and voids.

The fine crystalline structure which is responsibly for such an enormous strength in solidification and stabilisation in contaminated sludge, such as contaminated sludge from the so-called "Galligu-sites" in Great Britain, is attributed to the basic structure of the present binder composition and it's needle forming tendencies with surrounding molecules in such sludge.

It is observed that large concentration of crystals of both $Ca(OH)_2$ and Primary ettringite shows significantly very low voids leading to fine and needle like structures. Observing these needles, it appears that these were formed from the present binder composition during the initial process of hydration of the cement. It shows that the present binder composition is capable of producing long-needle crystalline formations in the process of solidification and stabilization of the contaminated material, such as sludge.

Formation of the Primary ettringite looking like needles and calcium hydroxide crystals around the aggregate particles have been shown using polarisation- and fluorescence microscopy (PFM) and environmental scanning electron microscopy (E-SEM). This shows that long needle crystals are formed in every direction in the present composition, which needle crystals attribute to significant strength of the final solidified material, such as sludge.

Figure 2:
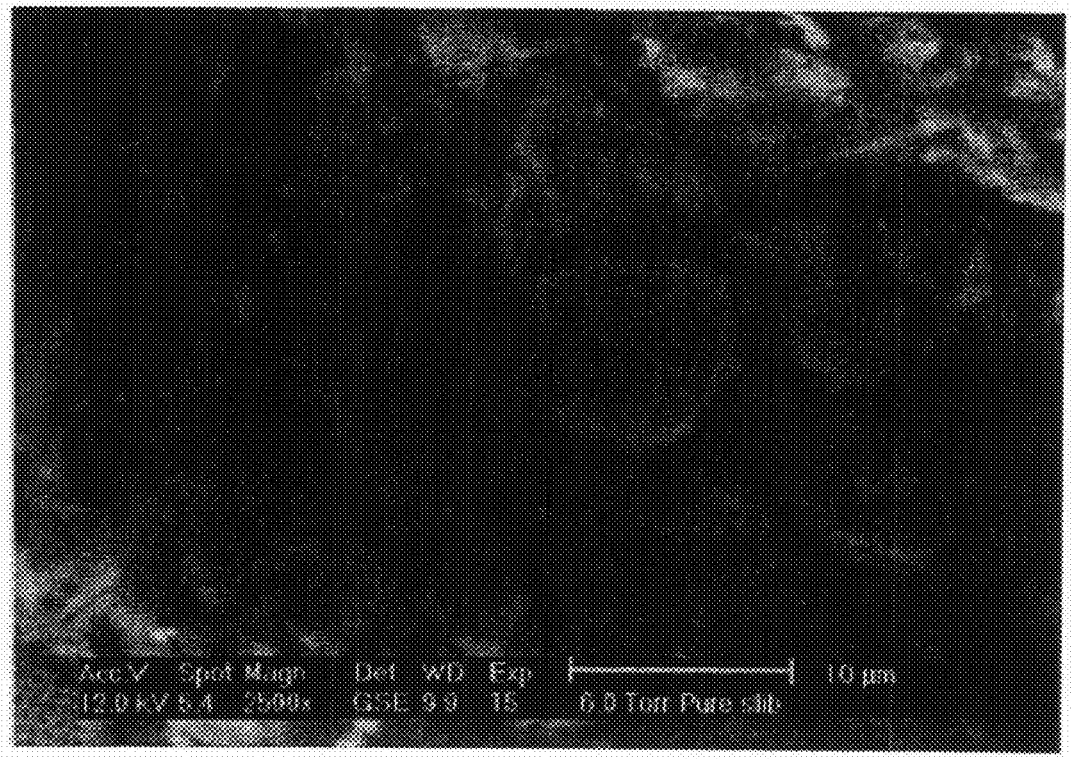

FIG. 1 shows an overview of the microstructure of unstabilized sludge, comprising a large amount of organic material. FIG. 2 shows a detail of FIG. 1 in which several diatomaceous are present.

Figure 3:
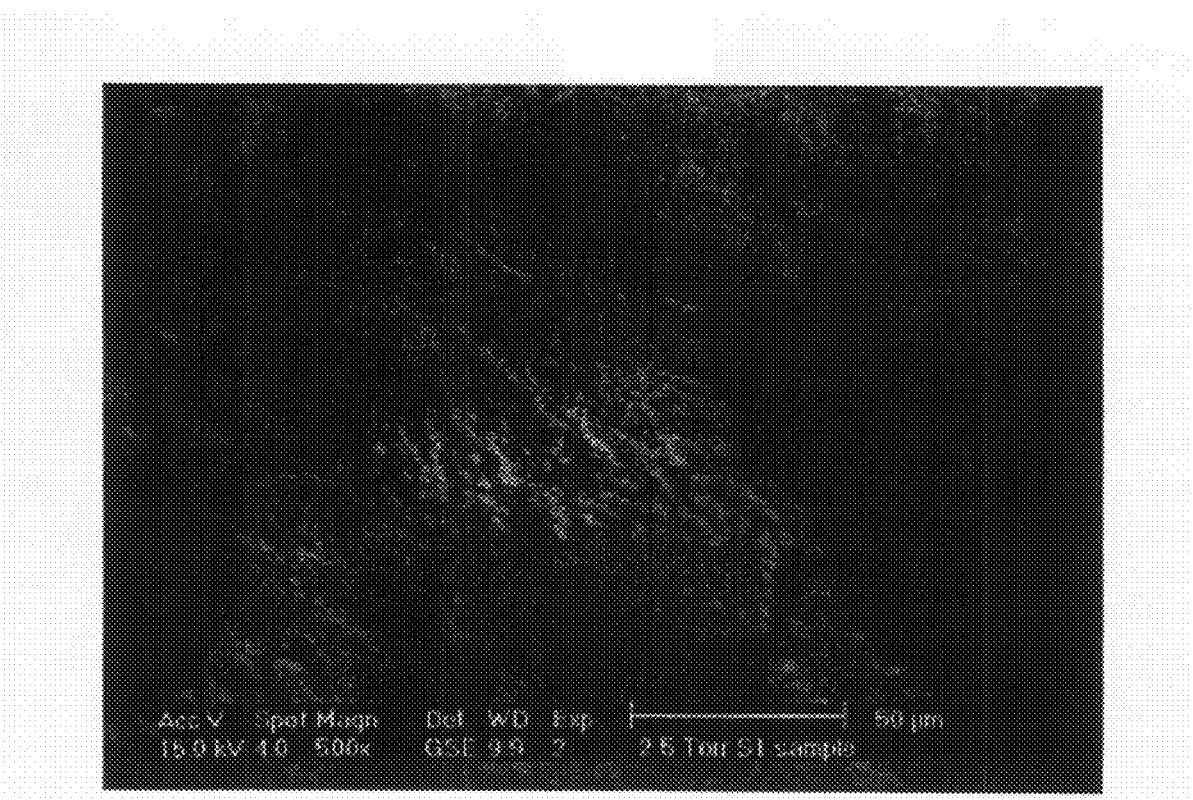
FIG. 3 shows a E-SEM picture of sludge stabilized with cement
Figure 4:
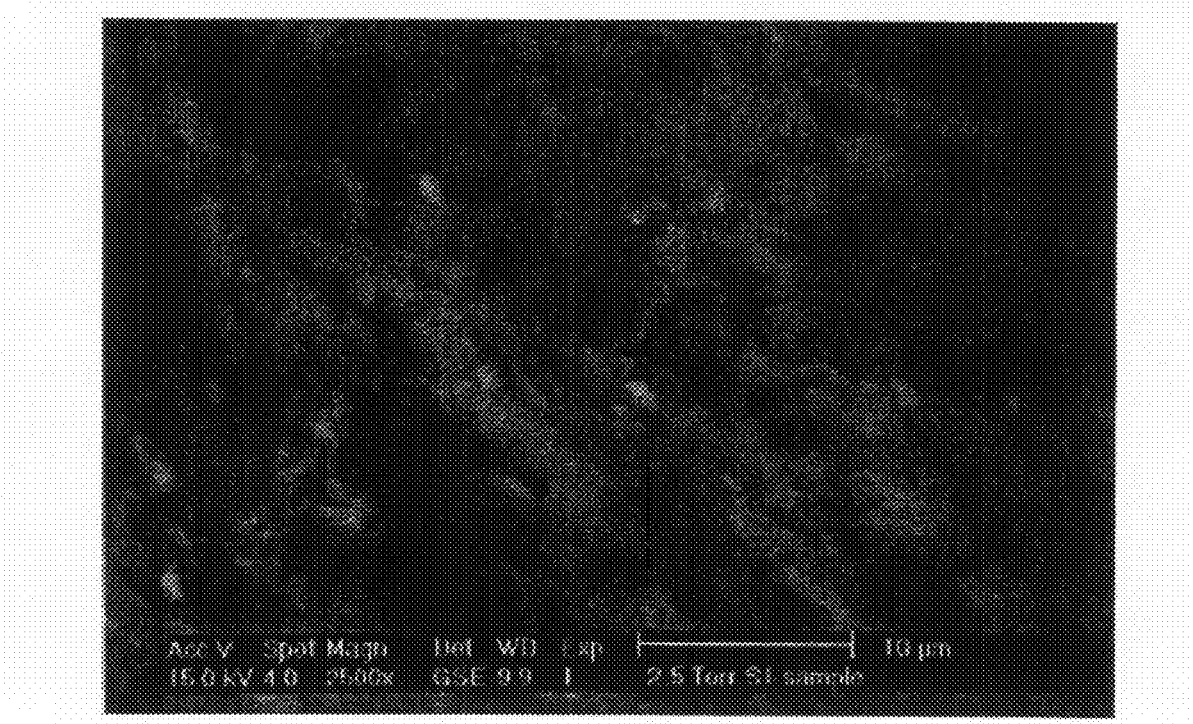
FIG. 4 shows a detail of FIG. 3

FIG. 3 shows an overview of the microstructure of a sludge stabilized by cement. FIG. 4 shows a detail of FIG. 3.

Figure 5:
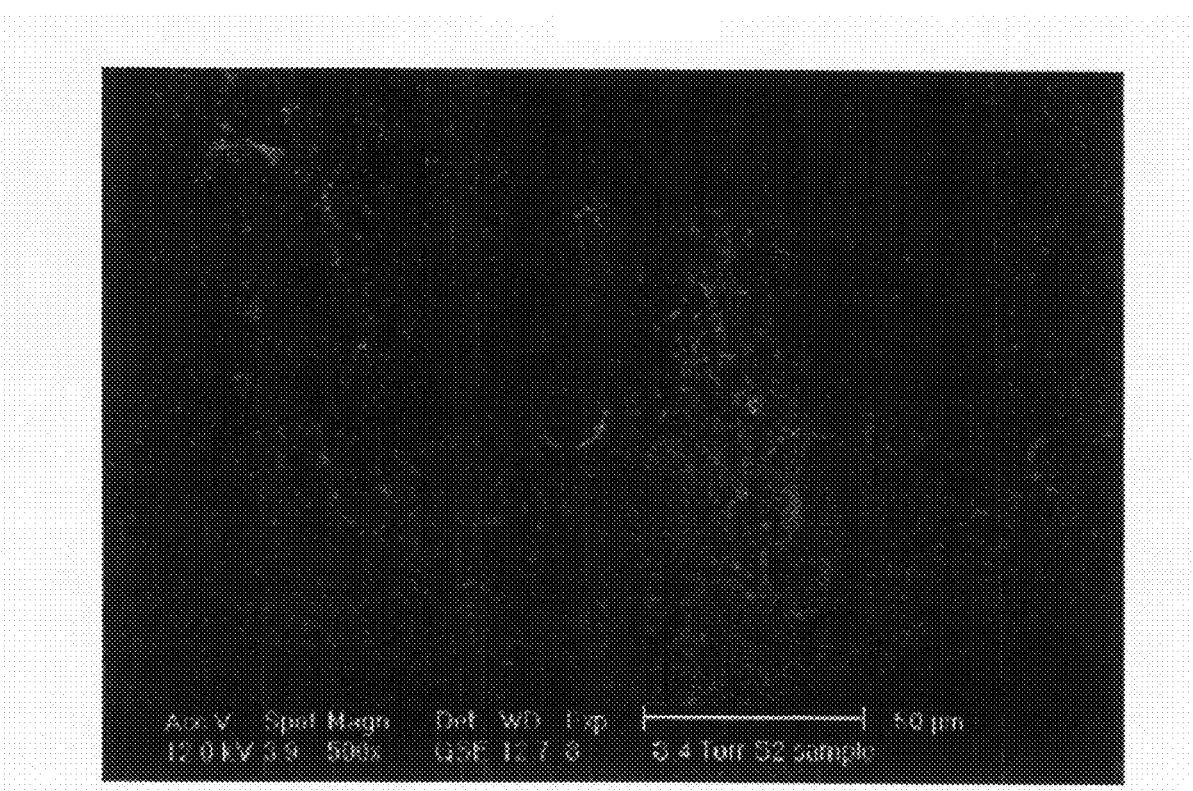
FIG. 5 shows a E-SEM picture of sludge stabilized with the present binder composition
Figure 6:
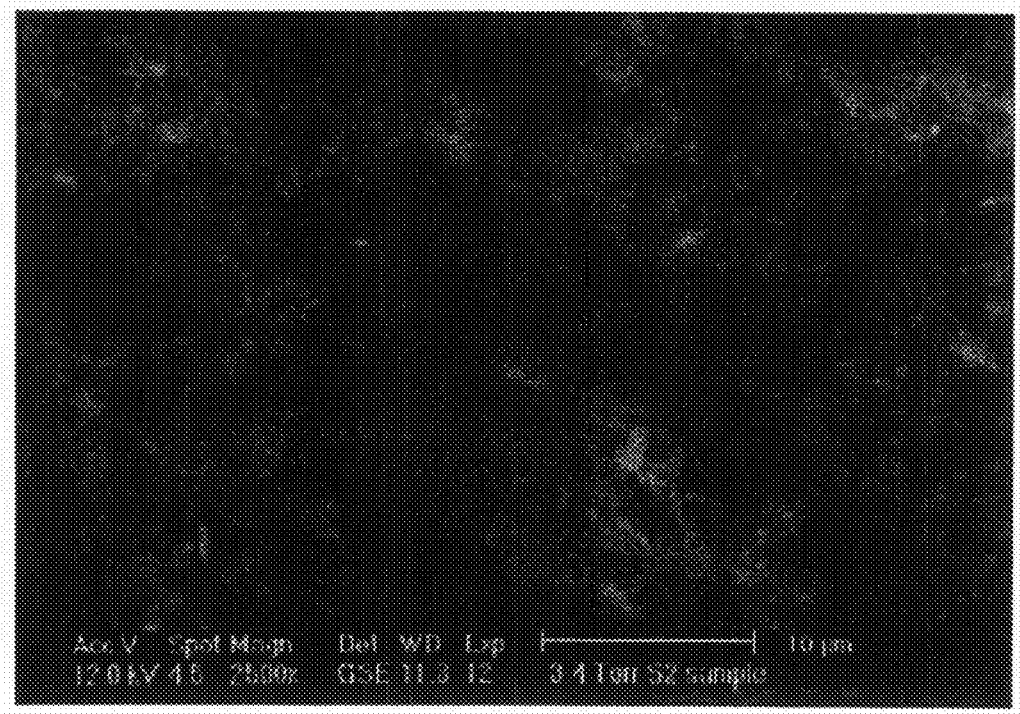
FIG. 6 shows a detail of FIG. 5.

FIG. 5 shows an overview of the microstructure of a sludge stabilized by the present binder composition. FIG. 6 shows a detail of FIG. 5, in which numerous ettringite needle crystals are clearly visible, which are characteristic of the use of the binder composition according to the present invention.

The above figures show the success of the use of the present binder composition for solidification of the contaminated sludge.

If little primary ettringite formation occurs, for example due to the use of a binder composition other than the composition according to the present invention, whilst the construction composition does contain tricalcium aluminate, ettringite will be formed yet at a later stage, the so-called secondary ettringite formation, as a result of the action of sulphates from the environment. This may leads to crack formation in the construction composition and thus to failure, which is undesirable.

Consequently, the formation of primary ettringite is desirable for a number of reasons, in the first place in order to enhance the durability, in the second place to form cage-like structures capable of trapping harmful atoms, ions and/or molecules, and in the third place to prevent secondary ettringite formation in that all the tricalcium aluminate that is present has already reacted and thus to reduce the risk of failure.

Sufficient ettringite formation is obtained with the binder composition and the construction composition according to the present invention, which not only leads to advantageous properties of the hardened construction material, but also to a reduced occurrence of secondary ettringite formation and thus to a reduced risk of failure of the construction material.

The present invention further has as an advantage, as mentioned above, that it can be used for immobilisation of heavy metals. There are for example environmental issues with treatment of the so-called bag house dust which is formed in coal-fired power plants. A large number of such plants and consequently a large amount of bag house dust are to be found in South-Africa, for example at the energy plant of Tubatse. Another waste issue is found at mines where heavy metals are extracted, such as chromium mines. In the process of obtained metals by mining, so-called slimes dams are left, which are depositions of waste that is formed during the process of mining. Because of the increase demand for metals, such as chromium, the volume of such slimes dams continues to grow. Such slimes dams are largely made up of oxides of silicon, titanium, aluminium and iron, contaminated with heavy metals.

In view of the above, the treatment of heavy metal effluents and discharges is a serious issue that needs to be solved. At this moment the removal of re-use of the metal component in these waste streams has proven futile and use of these waste streams in construction materials has been proven impossible up till now because of the leaching out of the heavy metals, which would give rise so a serious public health risk.

Therefore, the present inventor has conducted research to use the present binder composition to solve this problem, meaning neutralising and immobilising such heavy metal waste streams and transform these waste streams into useful products, such as for example construction materials. Such a neutralisation/immobilisation would lead to a reduction in waste streams and is an enormous improvement for the community since waste is transformed into usable construction materials. The binder composition according to the present invention is capable of absorbing heavy metals and immobilising these.

The application of the present binder composition for environmental purposes would not be to bind the heavy metals but to immobilize them in such a fashion that the leachability of the product is reduced or even eliminated. This allows the construction product to be reclassified to a lower hazardous rating. Only at a lower hazardous rating will the product be able to be used as construction material according to governmental regulations. This allows a large additional amount of construction material to be accessible which would not be accessible with the application of the present invention.

An additional advantage of the immobilisation of heavy metals is the reduction of the costs for transport and storage of waste having high levels of heavy metals. The degree of immobilisation of the heavy metals in the present product will be dependent on the selected binder composition.

Preferred embodiments of the present invention are give below.

In a preferred embodiment, the amount of component a) in the binder composition is 40-65 wt. %, in particular 50-60 wt. %, since this will provide optimum results if the binder is used in a construction composition (also refer to the examples hereinafter).

Preferably the ash of component a) is selected from E-fly ash, E-bottom ash, bag house dust and a combination thereof.

E-fly ash (pulverised coal fly ash) is a fine powder which consists mainly of spherical glassy particles having puzzolane properties (i.e. the particles cement with lime and water into stable compounds that do not dissolve in water). E-fly ash is released in pulverised coal-fired power plants, where the fly ash is separated from the flue glass flow by means of electrostatic filters. The properties of E-fly ash are influenced by the origin of the coal, the process conditions in the power plant and the manner of transportation of the ash. E-fly ash may cause environmental problems when released into the atmosphere.

E-bottom ash is released in pulverised coal-fired power plants. E-bottom ash is released as "heavy" ash particles during the combustion process. The material is a burned, dehydrated clay which is coloured brown-black. A distinction may be made into porous (sintered) and dense (molten) E-bottom ash granules. If the E-bottom ash is certified, it is also referred to as "boiler sand".

Bag house dust is a material that has physical properties that are comparable to E-fly ash.

In addition to E-fly ash and E-bottom ash, there is also the so-called WI fly ash and WI bottom ash (WI=Waste Incineration), which both have properties that are completely different from the properties of E-fly ash and E-bottom ash, and consequently WI fly ash and WI bottom ash are not suitable for use in the present binder composition.

WI fly ash consists of a fine dustlike/powdery material that is formed as a residual product in the incineration of domestic waste and comparable industrial waste. The incineration takes place in waste incineration plants and concerns the ash that can be separated from the crude flue gases from such a plant by means of electrostatic filters.

WI bottom ash (previously called "slag") consists for 50% of an amorphous mass and for the rest of other materials, such as glass, rubble/ceramics, slag-like material and small amounts of iron and non-combusted organic material. WI bottom ash is formed during the combustion of domestic waste and comparable industrial waste.

In a preferred binder composition, the amount of component b) is 0.5-1.0 wt. % of the total binder composition, as it has been found that good binding properties are obtained in particular in this range, whilst the composition is cost-effective.

Preferably, component b2) of the binder composition comprises a zeolite. Zeolite is a natural adsorption agent and is currently used predominantly in the iron exchange industry and other purification processes for the selective removal of a various types of metals and gasses. Component b2) may also comprise a combination of various zeolites. Said zeolite may for example be a zeolite selected from the group consisting of fibre-like zeolites, zeolites with double-bound 4-ring chains, zeolites with 6 rings, zeolites with 8, 10 and/or 12 rings, such as those from the mordenite group, zeolites from the Heulandite group, Goosecreekite, Partheite and the like. The zeolite may be of natural as well as of synthetic origin, the latter being preferred. Zeolite is preferable to silica and apatite, because zeolite takes up and binds specific ions and/or molecules having a specific mass and dimension within its cage-like structure, which has a further positive effect on the properties of the final product that have been discussed above with regard to ettringite.

The component from group b1) of the present binder composition is preferably selected from sodium chloride, potassium chloride, magnesium chloride, calcium chloride, barium chloride, ammonium chloride, strontium chloride and aluminium chloride and combinations thereof, because of the good properties of these materials.

The metal chloride is in particular selected from the group consisting of sodium chloride, calcium chloride and a combination thereof. The advantage of this is that an elastoplastic property is introduced as a result of the use of such a metal chloride, which, in combination with the other components, provides a composite-like final product as the binder, which is advantageous.

In a preferred embodiment, component b) further comprises one or more components from group (b3), wherein group (b3) consists of magnesium oxide, calcium oxide and a combination thereof, and wherein said one or more components from group (b3) make up 5-40 wt. % of the total weight of components (b1), (b2) and (b3), since this gives better binding properties.

In an especially preferred embodiment of the present binder composition, an additive composition as disclosed in WO 02/48067 in the name of the present inventor is used as component b). An example of this is a binder composition comprising 45-90 wt. % sodium chloride, potassium chloride, magnesium chloride, calcium chloride, strontium chloride, barium chloride and/or ammonium chloride, 1-10 wt. % aluminium chloride and 1-10 wt. % silica, zeolite and/or apatite.

The present invention further relates to a construction composition comprising:

i) a basic component in an amount of 50.0-98.0 wt. %, based on the total weight of the construction composition, selected from the group consisting of sand, loam, sandy clay, clay, concrete rubble, building rubble, asphalt granulate, harbour sludge, sewage sludge and industrial waste flows and combinations thereof, which basic component contains particles having a particle size of maximally 28 mm in an amount of at least 15 wt. % particles, based on the weight of the basic component;

ii) a binder composition according to the present invention in an amount of 2.0-50.0 wt. %.

The advantage of such a composition is that the composition can be used as a construction material, inter alia for structural and infrastructural applications. In addition to that, an hexavalent chromium that may be present in the construction composition is converted into trivalent chromium and trapped together with any radon that may be present in cement, so that it will not find its way into the environment (see the Examples).

Another advantage is that it is possible to use heterogeneous materials, such as heterogeneous sand, i.e. sand having a grain distribution of 0-6 mm, thus obtaining a construction composition having excellent constructional properties, which often appears not to be possible to a sufficient degree with construction compositions that do not fall within the scope of the present invention.

If component i) is present in the construction composition in an amount of less than 50.0 wt. %, or if component ii) is present in an amount of more than 50.0 wt. %, no additional binding effect will be obtained.

If component i) is present in the construction composition in an amount of more than 98.0 wt. %, or if component ii) is present in an amount of less than 2.0 wt. %, the binding effect will be insufficient, as a result of which the construction composition will thus exhibit insufficient structural qualities for the intended application.

The basic component contains particles that provide a monolithic structure of the construction compositions, which contributes to the required constructional properties.

In a preferred embodiment, the amount of binder composition in the present construction composition is 5.0-25.0 wt. %, in particular 8.0-15.0 wt. %, as the present inventors have found that this will provide optimum results as regards a number of properties (see the Examples).

The present invention also relates to a method for obtaining the present construction composition, which method comprises the mixing of component i), component ii) and water, the possible compaction of the mixture thus obtained and the reacting and hardening of the mixture thus obtained.

The construction composition according to the present invention is comparable to concrete. Concrete is a construction composition consisting of water, a binder (usually cement) and one or more washed aggregates, such as sand or gravel. These components are mixed in suitable ratios, as a result of which the hardness and durability of natural rock are equalled in hardened condition. Water cannot be added in unlimited amounts. The present construction composition is of a more composite nature than concrete, because also secondary flows from industrial processes can be added besides the standard washed aggregates.

The water/cement factor (W/C) is the proportion between the amount of water and the amount of cement in a construction mixture (such as concrete). Said W/C factor partially determines a number of properties of the construction composition, it would have to be at least 0.3 in order to have sufficient water for the hydration reaction with cement. In the case of a factor below 0.3, the concrete is difficult to shape because it is too dry, and the chemical reaction will not be complete, as a result of which the strength will be insufficient. Also the permeability and durability of the construction composition partially depend on the W/C factor. In mild conditions, for example a dry interior wall, the maximum W/C factor is as high as about 0.65, since such a construction composition is not exposed to an inflow of ions that are harmful to the construction composition. Exterior walls and walls that come into contact with seawater require a considerably lower maximum W/C factor, viz. a factor of maximally 0.4 for walls that come into contact with seawater, so as to extend the life span thereof. Thus it is of major importance to select the W/C factor correctly, depending on the desired application of the binder composition and the construction composition according to the present invention. Said W/C factor also depends on the selected manner of compacting the construction composition. If the construction composition is compacted with heavy equipment, a lower W/C factor will be required than in the situation where the construction composition is compacted by means of a needle vibrator. In addition to that, the water absorption capacity of the basic component and the amount of additive that is added play a role in the selection of the W/C factor. A person skilled in the art is capable of determining the corrective amount of water and thus the correct W/C factor for the intended application.

The hardening of the composition thus realised in order to obtain the present construction composition generally takes a number of days to about a month, for example 7 to 28 days, and depends on the basic material that is used. For example, if sand is used as the basic material, a hardening period of about 7 days will suffice, whereas a hardening period of up to 28 days may be required in the case of the presence of, for example, organic material. In addition to that, the amount of water plays a part in connection with the hardening period, with the hardening time increasing as the amount of water increases.

In addition to that the present invention relates to the use of the present construction composition as a paving layer on a subsoil. Think in this connection of roads (motorways, highways), lay-bys, runways for airfields, civil engineering applications (fly-overs, tunnels, bridges and the like) and other infrastructural applications.

The present invention furthermore relates to the use of the present construction composition for obtaining structural elements. Think in this connection of, for example, walls and floors of buildings and other urban development applications.

Preferred embodiments of the present invention are defined in the claims. The present invention will be explained hereinafter by means of a number of non limitative examples.

Examples

Materials Used

Additive composition A consists of 75% metal chlorides (24% NaCl, 1% $NH_4Cl$, 3% $AlCl_3.6H_2O$, 16% KCl, 15% $CaCl.2H_2O$, 16% $MgCl.6H_2O$) and 25% silica.

Additive composition B consists of 82% metal chlorides (31% NaCl, 1% $NH_4Cl$, 3% $AlCl_3.6H_2O$, 16% KCl, 15% $CaCl.2H_2O$, 16% $MgCl.6H_2$), 3% metal oxide (MgO), 3% metal carbonate (NaCO3) and 10% zeolite.

Basic component Q is ferruginous masonry sand.

Basic component R is a mixture of 30/70 w/w plastic clay and ferruginous masonry sand.

Basic component S is a mixture of 40/60 w/w ferruginous masonry sand and E-fly ash. E-fly ash from the Vereeniging, collected from the floor area of the precipitation tower of the Lethabo power station has been selected as the E-fly ash for the present examples. However, E-fly ashes from Matla, Kendall or Kelvin give comparable results. The chemical composition determined by XRF of said fly ashes is shown below.

E-fly ash from Lethabo (49.9% $SiO_2$, 32.74% $Al_2O_3$, 3.45% $Fe_2O_3$, 0.07% $Mn_2O_3$, 3.97% CaO, 1.29% MgO, 0.53% $P_2O_5$, 0.65%, $K_2O$, 0.24% $Na_2O$, 2.33% $TiO_2$, 0.41% $SO_3$, 1.23% other oxides.

E-fly ash from Matla (50% $SiO_2$, 31.58% $Al_2O_3$, 3.15% $Fe_2O_3$, 0.1% $Mn_2O_3$, 5.7% CaO, 1.66% MgO, 0.62% $P_2O_5$, 0.8%, $K_2O$, 0.28% $Na_2O$, 1.63% $TiO_2$, 0.48% $SO_3$, 1.29% other oxides.

E-fly ash from Kendall (51.29% $SiO_2$, 29.71% $Al_2O_3$, 4.61% $Fe_2O_3$, 0.08% $Mn_2O_3$, 5.22% CaO, 1.72% MgO, 0.9% $P_2O_5$, 0.79%, $K_2O$, 0.13% $Na_2O$, 2.12% $TiO_2$, 0.23% $SO_3$, 1.22% other oxides.

E-fly ash from Kelvin (29.3% $SiO_2$, 20.2% $Al_2O_3$, 2.63% $Fe_2O_3$, 0.06% $Mn_2O_3$, 8.03% CaO, 1.3% MgO, 0.70% $P_2O_5$, 0.73%, $K_2O$, 0.3% $Na_2O$, 1.16% $TiO_2$, 1.58% $SO_3$, 34.5% other oxides.

Bag house stof type A: from Tubatse, South-Africa: 28.53% $SiO_2$, 7.04% $Al_2O_3$, 3.09% $Fe_2O_3$, 0.84% CaO, 33.16% MgO, 0.33% MnO, 0.06% $P_2O_5$, 3.09%, $K_2O$, 3.21% $Na_2O$, 0.10% $TiO_2$, 7.44% $SO_3$, 4.42% $Cr_2O_3$, 0.01% NiO, 0.04% $V_2O_5$, 2.43% ZnO, 0.28% Cl, 5, 86% overige oxiden).

Bag house dust type B: from Middelburg, South-Africa. The specific composition of the bag house dust form Middelburg is not known exactly, however this is very similar to the composition from Tubatse.

The cement used in the examples is CEM1 42.5 from Pretoria Portland Cement.

Methods Used

Determination of the compression strength, E-modulus and splitting strength was carried out in accordance with DIN1048. The resistance to caustic and corrosive substances was tested by using a 30% NaOH solution, and following this a visual assessment was made whether this treatment had adversely affected the construction composition. The determination of the Proctor density was carried out in accordance with the method TP-BF-StB 4.1 bis 4.1.3.

Comparative Binder Compositions 1-3 and 19-21

A number of binder compositions, in amounts of 100 grammes, were prepared by dry mixing a specific amount of E-fly ash, a specific amount of additive composition B and a specific amount of cement. The amounts are shown in Table I.

Binder Compositions According to the Invention 4-18

A number of binder compositions, in amounts of 100 grammes, were prepared by dry mixing a specific amount of E-fly ash, a specific amount of additive composition A or B and a specific amount of cement. The amounts are shown in Table I.

Comparative Compositions 1-3, 19-22 and 31

A number of comparative construction compositions were prepared, using the dry comparative binder compositions 1-3 and 19-21 and binder composition according to the invention 11 (see Table II). These compositions were mixed, in the amounts shown in Table II, with basic component Q, in the amount shown in Table II, and with sufficient water to obtain a mixture which, after hardening, for example for 7-28 days, forms a construction composition having an optimum Proctor density. The properties regarding compression strength, E modulus, splitting strength, resistance to caustic and corrosive substances and durability, as measured after hardening, are shown in Table III.

Compositions According to the Invention 4-18, 23-30 and 32-40

A number of construction compositions were prepared, using dry binder compositions 4-18 according to the invention (see Table II). These compositions were mixed, in the amounts shown in Table II, with basic components Q, R and S, in the amounts shown in Table II, and sufficient water to obtain a mixture which, after hardening for 7-28 days, formed a construction composition having an optimum Proctor density. The properties regarding compression strength, E-modulus, splitting strength, resistance to caustic and corrosive substances and durability, as measured after hardening, are shown in Table III.

Table III shows for example that the compositions according to the present invention exhibit better results than the comparative compositions.

To demonstrate that in particular the amount of ash and the amount cement are of major importance to the properties of the present construction composition, four construction compositions will be shown below, which construction compositions were subjected to tests after 14 days of hardening to determine the compression strength, the E-modulus, the splitting strength and the resistance to caustic and corrosive substances. The binder composition consisted of 0.1% additive B and 90% (comparative example), 80% (comparative example), 70% (according to the invention) or 60% (according to the invention) E-fly ash and 9.9%, 19.9%, 29.9% and 39.9% cement, respectively.

The compression strength of compositions comprising 90%, 80%, 70% or 60% E-fly ash was 1.2 $N/mm^2$, 1.4 $N/mm^2$, 2.9 $N/mm^2$ and 4.9 $N/mm^2$, respectively. The E-modulus of compositions comprising 90%, 80%, 70% or 60% E-fly ash was 2200 $N/mm^2$, 2800 $N/mm^2$, 5800 $N/mm^2$ and 10800 $N/mm^2$, respectively. The splitting strength of compositions comprising 90%, 80%, 70% or 60% E-fly ash was 0.20 $N/mm^2$, 0.28 $N/mm^2$, 0.60 $N/mm^2$ and 1.50 $N/mm^2$, respectively. The resistance to caustic and corrosive substances of compositions comprising 90%, 80%, 70% or 60% E-fly ash was low/moderate, moderate, moderate/good and good, respectively.

From this it appears, therefore, that in order to obtain a satisfactory result as regards the above properties, an E-fly ash percentage of maximally 70% is required, preferably maximally 60%.

Using binder composition 14, additional tests were carried out, using the basic components Q and R, with 8, 12 or 18% of the binder 14 being used in combination with 92%, 88%, and 82%, respectively, of the basic component. These additional tests will be explained below, and the results are shown in Table IV. Two verification compositions, viz. without binder composition, were used as well, with verification composition 1 consisting of basic component Q and verification composition 2 consisting of basic component R. The tests were carried out on samples obtained by mixing the binder, the basic component and sufficient water, and allowed to harden according to the manner as described hereinafter for each test method.

A first strength test that was carried out was the determination of the so-called CBR, or California Bearing Ratio. In this test, the compositions were allowed to harden for 7 days at 100% relative humidity and subsequently subjected to a standard test method of TMH1 (Technical Methods for Highways, No. 1, 1986, Pretoria Department of Transport). From the results shown in Table IV it appears that the strength increased significantly in comparison with the verification composition when the binder according to the present invention was used. In addition to that, the strength increased as the amount of binder increased, it increased only marginally, however, when basic component Q was used, and it increased significantly when basic component R was used. Consequently, the optimum amount of binder will have to be determined individually for each basic component that is used.

A second strength test that was carried out was the so-called USC test (Unconfined Compressive Strength), which was carried out on samples which had hardened for different periods (0, 1, 2, 7, 14, 21, and 28 days). The compositions were statically compressed to obtain shapes having a diameter of 101.4 mm, a height of 115 mm and a density equivalent to 95% Mod AASHTO. After hardening, the samples were immersed for 2 hours and subsequently tested as described in TMH1 (see the above).

From the results shown in Table IV it appears that a value of zero for the USC was found for the verification compositions, the reason for this is that these compositions disintegrated within 4 minutes after being immersed in water. All the construction compositions were found to exhibit an improved USC value as the hardening time increased. The USC value increased along with the amount of binder composition, whilst it furthermore appeared that the USC value for basic component Q was higher than for basic component R. The optimum value for the amount of binder will have to be determined in dependence on the desired USC value and the selected basic component, therefore.

A first durability test that was carried out was the so-called RUSC test (Residual Unconfined Compressive Strength), which is used for assessing whether samples, when subjected to moisturisation and drying or exposure to $CO_2$ retain sufficient structural integrity to continue to comply with the originally intended parameters. The samples were formed in the manner described above for USC and allowed to harden for 7 days. Subsequently the samples were placed 24 hours in a chamber through which $CO_2$ was passed. Following that, the samples were allowed to soak for 4 hours and subjected to the USC test in the same manner as described above. From the results as shown in Table IV it appears dat neither of the two verification compositions gave an RUSC value, since these samples fell apart during the soaking treatment. Furthermore it appears that the RUSC values increased as the amount of binder increased, and that the values for basic component Q were higher than those for basic component R, which was also observed for the USC-values (see the above). The data show that construction compositions according to the invention retained their structural integrity to a sufficient degree after the test.

A second durability test that was carried out was a test for determining the resistance to erosion, which is of major importance inter alia in those cases in which the construction composition is used in road construction. Beams were to that end formed from the construction composition, which beams were compressed to 100% Mod AASHTO (American Association of State Highway and Transportation Officials). The beams were subsequently allowed to harden for 28 days at 100% relative humidity and subsequently subjected to mechanical erosion (Gass, Venturea & de Beer in "erodibility of cemented materials, Transportek, CSIR, Research Report, RR91/167/1, 1992). The erosion index was determined by measuring the wear depth in millimetres.

If the construction composition is to be used as the base layer for a road that is frequently subjected to heavy traffic loads, the erosion index must be lower than or equal to 1.0 mm. If the construction composition is to be used as a sublayer for a road that is frequently subjected to heavy traffic loads, the erosion index must be lower than or equal to 3.0 mm, and if the construction composition is to be used in a road that is less frequently subjected to heavy traffic loads, the erosion index must be lower than or equal to 5.0 mm. From the results shown in Table IV it appears that the verification compositions are unsuitable for road construction applications. In addition to that it appears that composition 28 (18% binder in basic component Q) gave an erosion index score satisfactory for use as a base layer for a road. Compositions 26 and 40 are satisfactory for a road with heavy traffic loads, and compositions 25, 38 and 39 are satisfactory for use as a sublayer for a road with less heavy traffic loads.

Furthermore, tests were carried out on unpaved roads, which are still found in many remote areas or less developed countries. Tests were carried out to determine the wear resistance, the water-erosion resistance and the sensitivity to moisture.

The wear resistance was measured on samples that had been compressed to 95% Mod AASHTO into shapes having a diameter of 101.4 mm and a height of 115 mm. After hardening for 7 days at 100% relative humidity, the samples were dried in a furnace at 50° C. until they were dry. Following that, the samples were fixed in a device comprising a mechanical brush with a brush load of 2.5 kg, and the sample was brushed at 60 revolutions per minute for 250 or 500 revolutions. The wear resistance is preferably such that the loss in % after 500 revolutions is less than 10. From the results shown in Table IV it appears that the verification compositions failed to comply with this preferred standard, in contrast to all the measured construction compositions according to the invention.

The water-erosion resistance was measured, using samples formed in the same manner as described above with reference to wear resistance. Subsequently, the samples were placed in a device in which water was passed over the samples for 5 minutes. The water-erosion resistance is preferably such that the loss in % amounts to less than 8 after 5 minutes. From the results shown in Table IV it appears that neither of the two verification compositions complied with this preferred standard, in contrast to all the measured construction compositions according to the invention.

The sensitivity to moisture was measured, using samples formed in the same manner as described above with reference to wear resistance. Subsequently, the samples were placed in water and allowed to soak for 120 minutes. The disintegration time of the samples is shown. If the samples did not disintegrate, a disintegration time of >120 minutes was recorded. From the results shown in Table IV it appears that both verification compositions disintegrated within a few minutes. Furthermore it appears that, with the exception of the sample of construction composition 38, alle the measured construction compositions exhibited good results.

Furthermore, a number of other tests were carried out, viz. a "strain at break" test and a static and dynamic triaxial test. The results of these tests are shown in Table V.

The "strain at break" tests were carried out as the present construction compositions, when used in road construction, are subjected to major stresses caused by the traffic. If a construction composition is subjected to too much stress, this may lead to crack formation, which is undesirable. The strain at break was determined by means of a so-called FB-test (Flexural Beam). The compositions to be measured were compressed to 100% Mod AASHTO to obtain samples having a length of 450 mm and a width and depth of 75 mm. Subsequently the samples were placed in a plastic bag and allowed to harden for 24 hours, followed by drying to a constant weight in a furnace at 40° C. The strain at break and the tensile strength were then determined. The verification samples could not be measured, on account of the fact that they had disintegrated. From the results shown in Table V it appears that the tensile strength increased as the concentration of binder increased. The strain at break of the samples formed by using basic component Q exhibited a linear increase, whereas the samples formed by using basic component R exhibited a slight decreases with a binder concentration of 18%.

Triaxial tests were carried out in order to the determine the material strength both under static loads and under dynamic loads and in order to give an indication of the performance of roads constructed from the compositions as regards their resistance to permanent deformation caused by traffic loads over time. Tests were only carried out with compositions 26 and 39 and both verification compositions. The samples were compressed to 100% Mod AASHTO. The conditions of the static and dynamic triaxial tests are shown in Table VI and Table VII, respectively. The results of the static and dynamic triaxial tests (50.000 repetitions) are shown in Table V.

Tests Regarding Immobilization of Chromium (VI)

The aim of these tests is to investigate the effectiveness of the present binder composition for immobilization of chromium (VI) in a final construction composition. The tests have been conducted using chromium (VI) containing bag house dust from ferro-chrome furnaces.

During the tests the properties of construction compositions using binder compositions have been tested. The present inventors have observed that the bag house dust has a high water demand. It is possible to add a plasticizer, such as for example Glenium 51 of BASF, being an aqueous solution of polycarboxylate ether, to the composition.

The obtained construction composition were cast in 75 mm mortar beams using different construction compositions. Subsequently, the structural properties were determined and the broken pieces of the beams were used to establish the degree of chromium (VI) immobilization.

The composition of the different samples, being comparative composition 41 and compositions 42-45 are depicted in Table VIII. The structural results of the concrete strength (MPa) at different maturity dates are illustrated in Table IX.

The Table shows that the application of a binder composition comprising 53.5 wt. % component a), 0.5 wt. % component b), and 46 wt. % component c) (compositions 42 and 43) give good results for both types of bag house dust (composition 42 is type A, composition 43 is type B). Lowering the percentage of component a) in favor of component c) in compositions 44 and 45 (48.9 wt. % component a), 0.5 wt. % component b) and 50.6 wt. % component c)) has a positive effect on the strength of the binder composition.

The results show clearly that the present binder composition using bag house dust is suitable as a binder in a construction composition. Table IX clearly shows that the results for the concrete strength improve remarkable under the application of the present binder composition (compositions 42-45) compared to another binder (comparative example 41).

Besides a good concrete strength a good immobilization of chromium (VI) is also essential, because if there is insufficient immobilization, legal requirements will not be met and the construction composition will not be allowed to be used as a construction composition. Therefore, tests have been conducted to study the immobilization of chromium (VI). The chromium (VI) content after immobilization was determined and measured using both the South-African as Dutch regulations, for which different tests are used.

The conditions of the test according to the South-African standard is according to Appendix 8.5 (Toxicity Characteristics and acid rain leaching procedures) of "A8-12 Minimum requirements for the Handling, Classification and Disposal of Hazardous waste, 2nd edition, 1998". The conditions of the test according to the Dutch standard is according to NEN 7341, 1$^{st}$ edition, February 1995.

The results of the tests are depicted in Table X. The Table clearly shows that there is a large difference between the results as measured according to the Dutch standard and according to the South-African standard. The values for comparative example 41 have not been determined. However, several other comparative examples, in which cement alone, is used as binder, have been conducted and although not depicted in Table X, the total amount of chromium is reduced by more than 40% when the present compositions were used compared to when cement alone is used as a binder.

All samples were found to be alright according to the Dutch criteria, but none of the samples were alright according to the South-African criteria. It is important to notice that not only does the South-African test method results in higher detectable values, but also that the acceptable risk limit in South-Africa is lower and hence the standard is higher than in other countries. Even though none of the samples complied with the South-African acceptable risk limit, it is usual that concrete in normal form is only used under this limit and that a reduction of chromium (VI) of 96% to 99% was possible.

The above results illustrate that immobilization of chromium (VI) is possible using the present binder composition. However, the precise optimal composition will depend on the composition of the bag house dust. A person skilled in the art will, using the teachings of the present application, be able to determine the most optimal composition.

Further embodiments of the present invention are defined in the appended claims.

TABLE I

| Composition binder: | Ash (wt. %) | Type of additive | additive (wt. %) | Cement (wt. %) |
|---|---|---|---|---|
| Comparative Binder 1 | 10 | B | 0.1 | 89.9 |
| Comparative Binder 2 | 10 | B | 1 | 89 |
| Comparative Binder 3 | 10 | B | 5 | 86 |
| Binder 4 acc. to invention | 30 | B | 0.1 | 69.9 |
| Binder 5 acc. to invention | 30 | B | 1 | 69 |
| Binder 6 acc. to invention | 30 | B | 5 | 65 |
| Binder 7 acc. to invention | 50 | A | 0.1 | 49.9 |
| Binder 8 acc. to invention | 50 | A | 1 | 49 |
| Binder 9 acc. to invention | 50 | A | 5 | 45 |
| Binder 10 acc. to invention | 50 | B | 0.1 | 49.9 |
| Binder 11 acc. to invention | 50 | B | 1 | 49 |
| Binder 12 acc. to invention | 50 | B | 5 | 45 |
| Binder 13 acc. to invention | 59 | B | 0.1 | 40.9 |
| Binder 14 acc. to invention | 59 | B | 1 | 40 |
| Binder 15 acc. to invention | 59 | B | 5 | 36 |
| Binder 16 acc. to invention | 70 | B | 0.1 | 29.9 |
| Binder 17 acc. to invention | 70 | B | 1 | 29 |
| Binder 18 acc. to invention | 70 | B | 5 | 25 |
| Comparative Binder 19 | 90 | B | 0.1 | 9.9 |
| Comparative Binder 20 | 90 | B | 1 | 9 |
| Comparative Binder 21 | 90 | B | 5 | 5 |

TABLE II

| Composition: | Type of binder | Binder (wt. %) | Type of basic component | basic component (wt. %) |
|---|---|---|---|---|
| Comparative composition 1 | 1 | 10 | Q | 90 |
| Comparative composition 2 | 2 | 10 | Q | 90 |
| Comparative composition 3 | 3 | 10 | Q | 90 |
| Composition 4 | 4 | 10 | Q | 90 |
| Composition 5 | 5 | 10 | Q | 90 |
| Composition 6 | 6 | 10 | Q | 90 |
| Composition 7 | 7 | 10 | Q | 90 |
| Composition 8 | 8 | 10 | Q | 90 |
| Composition 9 | 9 | 10 | Q | 90 |

TABLE II-continued

| Composition: | Type of binder | Binder (wt. %) | Type of basic component | basic component (wt. %) |
|---|---|---|---|---|
| Composition 10 | 10 | 10 | Q | 90 |
| Composition 11 | 11 | 10 | Q | 90 |
| Composition 12 | 12 | 10 | Q | 90 |
| Composition 13 | 13 | 10 | Q | 90 |
| Composition 14 | 14 | 10 | Q | 90 |
| Composition 15 | 15 | 10 | Q | 90 |
| Composition 16 | 16 | 10 | Q | 90 |
| Composition 17 | 17 | 10 | Q | 90 |
| Composition 18 | 18 | 10 | Q | 90 |
| Comparative composition 19 | 19 | 10 | Q | 90 |
| Comparative composition 20 | 20 | 10 | Q | 90 |
| Comparative composition 21 | 21 | 10 | Q | 90 |
| Comparative composition 22 | 14 | 1 | Q | 99 |
| Composition 23 | 14 | 2 | Q | 98 |
| Composition 24 | 14 | 5 | Q | 95 |
| Composition 25 | 14 | 8 | Q | 92 |
| Composition 26 | 14 | 12 | Q | 88 |
| Composition 27 | 14 | 15 | Q | 85 |
| Composition 28 | 14 | 18 | Q | 82 |
| Composition 29 | 14 | 25 | Q | 75 |
| Composition 30 | 14 | 50 | Q | 50 |
| Comparative Composition 31 | 14 | 75 | Q | 25 |
| Composition 32 | 13 | 10 | R | 90 |
| Composition 33 | 14 | 10 | R | 90 |
| Composition 34 | 15 | 10 | R | 90 |
| Composition 35 | 13 | 10 | S | 90 |
| Composition 36 | 14 | 10 | S | 90 |
| Composition 37 | 15 | 10 | S | 90 |
| Composition 38 | 14 | 8 | R | 92 |
| Composition 39 | 14 | 12 | R | 88 |
| Composition 40 | 14 | 18 | R | 82 |

TABLE III

| Composition | Compression strength | E-modulus | Splitting strength | Resistance to caustic and corrosive substances | Durability |
|---|---|---|---|---|---|
| Comp. composition 1 | -- | - | -- | - | -- |
| Comp. composition 2 | - | -- | -- | - | - |
| Comp. composition 3 | - | o | - | - | o |
| Composition 4 | - | o | o | - | o |
| Composition 5 | - | o | o | o | o |
| Composition 6 | - | o | - | o | - |
| Composition 7 | o | o | o | - | - |
| Composition 8 | o | o | o | o | o |
| Composition 9 | o | o | - | o | - |
| Composition 10 | o | + | + | + | o |
| Composition 11 | + | ++ | + | + | + |
| Composition 12 | + | ++ | + | + | + |
| Composition 13 | ++ | ++ | + | ++ | + |
| Composition 14 | ++ | ++ | ++ | ++ | + |
| Composition 15 | ++ | ++ | + | ++ | ++ |
| Composition 16 | + | + | + | + | + |
| Composition 17 | + | + | ++ | ++ | + |
| Composition 18 | + | + | + | ++ | + |
| Comp. composition 19 | - | o | - | o | o |
| Comp. composition 20 | o | o | o | o | o |
| Comp. composition 21 | - | o | - | o | - |
| Comp. composition 22 | - | - | -- | - | - |
| Composition 23 | - | o | - | o | o |
| Composition 24 | +/o+/ | o | o | o | o |
| Composition 25 | ++ | ++ | + | ++ | + |
| Composition 26 | ++ | ++ | ++ | ++ | ++ |
| Composition 27 | ++ | ++ | + | ++ | ++ |
| Composition 28 | + | ++ | + | ++ | ++ |
| Composition 29 | + | + | + | + | + |
| Composition 30 | +/o | + | +/o | + | + |
| Comp. composition 31 | o | + | o | o | o |
| Composition 32 | ++ | + | + | ++ | +/o |
| Composition 33 | ++ | + | ++ | ++ | +/o |
| Composition 34 | ++ | + | + | ++ | +/o |
| Composition 35 | ++ | + | + | + | + |
| Composition 36 | ++ | + | ++ | + | + |
| Composition 37 | + | + | + | + | + |

Description of the symbols used in Table III:

--: very poor

-: poor o: mediocre

+: good

++: very good

TABLE IV

| Composition | CBR (%) | USC day 0 | USC day 1 | USC day 2 | USC day 7 | USC day 14 | USC day 21 | USC day 28 | RUSC | wear erosion test | % mass loss 250× | % mass loss 500× | Water erosion % mass loss | disintegration time (min) |
|---|---|---|---|---|---|---|---|---|---|---|---|---|---|---|
| 25 | 740 | 1003 | 1325 | 1552 | 1943 | 2380 | 2851 | 3471 | 2988 | 5 | 1.1 | 4 | 0.08 | >120 |
| 26 | 780 | 1324 | 1550 | 1700 | 2500 | 3524 | 4222 | 5006 | 4578 | 1.25 | 0.48 | 1.4 | 0.07 | >120 |
| 28 | 850 | 1656 | 1905 | 2010 | 3570 | 5005 | 6052 | 6983 | 7675 | 1 | 0.18 | 0.3 | 0.05 | >120 |
| 38 | 32 | 400 | 656 | 799 | 1505 | 2522 | 3003 | 3411 | 2675 | 7.4 | 0.7 | 1.5 | 0.2 | 20 |
| 39 | 125 | 625 | 799 | 985 | 2005 | 3232 | 3851 | 4255 | 3344 | 3.3 | 0.31 | 0.8 | 0.1 | >120 |
| 40 | 413 | 1050 | 1350 | 1500 | 2905 | 4250 | 5252 | 5858 | 5291 | 1.5 | 0.12 | 0.22 | 0.04 | >120 |
| Verification 1 | 53 | 0 | 0 | 0 | 0 | 0 | 0 | 0 | 0 | 19.1 | 26.2 | 50 | 17 | 4 |
| Verification 2 | 8 | 0 | 0 | 0 | 0 | 0 | 0 | 0 | 0 | 11.7 | 3.6 | 11.9 | 61.1 | 3 |

TABLE V

| Composition | strain at break | tensile strength (kPa) | Static triaxial test σ1 (kPa) | Static triaxial test confining stress σ3(kPa) | Static triaxial test τmax (kPa) | Static triaxial test mean shear strength | dynamic triaxial test resilient modulus | dynamic triaxial test permanent deformation (in mm) | dynamic triaxial test stress ratios (%) |
|---|---|---|---|---|---|---|---|---|---|
| 25 | 80 | 150 | — | — | — | — | — | — | — |
| 26 | 145 | 490 | 3809 | 22 | 1894 | 2162 | 4816.0 | 0.226 | 0.41 |
|  |  |  | 4642 | 81 | 2281 |  | 5565.7 | 0.049 | 1.17 |
|  |  |  | 4672 | 49 | 2312 |  | 4441.6 | 0.147 | 1.18 |
| 28 | 175 | 1050 | — | — | — | — | — | — | — |
| 38 | 170 | 200 | — | — | — | — | — | — | — |
| 39 | 240 | 450 | 2718 | 21 | 1359 | 1363 | 908.9 | 0.016 | 0.39 |
|  |  |  | 2698 | 41 | 1348 |  | 1532.6 | 0.855 | 0.60 |
|  |  |  | 2762 | 73 | 1381 |  | 1561.3 | 0.178 | 1.09 |
| 40 | 220 | 580 | — | — | — | — | — | — | — |
| Verification 1 | — | — | 365 | 18 | 174 | 298 | 967.3 | 0.447 | 0.2 |
|  |  |  | 776 | 86 | 345 |  | 519.0 | 0.491 | 0.88 |
|  |  |  | 853 | 102 | 376 |  |  |  |  |
| Verification 2 | — | — | 365 | 18 | 174 | 298 | 524.7 | 0.781 | 0.19 |
|  |  |  | 776 | 86 | 345 |  | 479.3 | 0.680 | 0.52 |
|  |  |  | 853 | 102 | 376 |  |  |  |  |

TABLE VI

| Composition | Dry density (kg/m³) | moisture content (%) | intended confining stress (kPa) | actual confining stress (σ3)(kPa) | failure load (kN) | failure stress or deviator stress (σd) | stiffness | σ1 (kPa) | P (KPa) | Q (KPa) | Cohesion(kPa) friction angle (°) tangent line correlation (r²) | actual moisture content (%) | echte droge dichtheld (kg/m³) |
|---|---|---|---|---|---|---|---|---|---|---|---|---|---|
| 26 | 2054 | 9 | 20 | 22 | 68.7 | 3787 | 684 | 3809 | 1915.5 | 1893.5 | 465.5 | 8.9 | 2047 |
|  |  |  | 50 | 49 | 83.9 | 4623 | 610 | 4672 | 2360.5 | 2311.5 | 60.2 | 8.3 | 2055 |
|  |  |  | 80 | 81 | 82.8 | 4561 | 524 | 4642 | 2361.5 | 2280.5 | 1.0 | 8.4 | 2057 |
| Verification 1 | 2054 | 8.5 | 20 | 18 | 6.3 | 347 | 33 | 365 | 191.5 | 173.5 | 53.7 | 5.4 | 2115 |
|  |  |  | 80 | 86 | 12.5 | 690 | 41 | 776 | 431 | 345 | 45.2 | 6.8 | 2087 |
|  |  |  | 100 | 102 | 13.6 | 751 | 49 | 853 | 477.5 | 375.5 | 1.0 | 6.7 | 2089 |
| 39 | 1864 | 16 | 20 | 21 | 49.3 | 2718 | 459 | 2739 | 1380 | 1359 | 899.8 | 15.9 | 1898 |
|  |  |  | 40 | 41 | 48.9 | 2696 | 421 | 2737 | 1389 | 1348 | 22.1 | 15.7 | 1901 |
|  |  |  | 70 | 73 | 50.1 | 2762 | 490 | 2835 | 1454 | 1381 | 0.8 | 16.1 | 1894 |
| Verification 2 | 1864 | 14 | 20 | 22 | 13.2 | 729 | 66 | 751 | 365.5 | 364.5 | 224.2 | 11.0 | 1915 |
|  |  |  | 40 | 41 | 13.7 | 756 | 81 | 797 | 419 | 378 | 24.5 | 4.5 | 2034 |
|  |  |  | 70 | 72 | 12 | 662 | 116 | 734 | 403 | 331 | 1.0 | 11.4 | 1907 |

TABLE VII

| Composition | Dry density (kg/m³) | moisture content (%) | intended dynamic test conditions | | | | actual dynamic test conditions | | | | test moisture content (%) | actual dry density (kg/m³) |
|---|---|---|---|---|---|---|---|---|---|---|---|---|
| | | | confining stress (kPa) | test load (kN) | Test stress (kPa) | Stress ratios | confining stress (kPa) | test load (kN) | Test stress (kPa) | Stress ratio | | |
| 26 | 2054 | 9 | 80 | 16.5 | 909.6 | 0.20 | 80 | 19.4 | 1069.0 | 0.56 | 5.5 | 2112 |
| | | | | 45.4 | 2501.3 | 0.55 | 79 | 53.2 | 2932.0 | 1.29 | 6.2 | 2099 |
| | | | | 74.3 | 4093.1 | 0.90 | 82 | 40.0 | 2204.5 | 0.95 | 6.1 | 2100 |
| Verification 1 | 2054 | 9 | 80 | 2.4 | 130.3 | 0.20 | 81 | 2.4 | 132.0 | 0.20 | 6.0 | 2102 |
| | | | | 6.5 | 358.2 | 0.55 | — | — | — | — | — | — |
| | | | | 10.6 | 586.2 | 0.90 | 82 | 10.6 | 584.0 | 0.88 | 6.4 | 2095 |
| 39 | 1864 | 14 | 80 | 10.0 | 553.5 | 0.20 | 81 | 9.7 | 534.5 | 0.39 | 16.0 | 1832 |
| | | | | 27.6 | 1522.1 | 0.55 | 82 | 26.7 | 1471.5 | 1.09 | 16.8 | 1820 |
| | | | | 45.2 | 2490.7 | 0.90 | 80 | 15.0 | 826.5 | 0.60 | 16.0 | 1832 |
| Verification 2 | 1864 | 14 | 80 | 2.9 | 162.3 | 0.20 | 81 | 2.8 | 154.4 | 0.19 | 13.6 | 1870 |
| | | | | 8.1 | 446.3 | 0.55 | 80 | 7.7 | 424.5 | 0.52 | 11.4 | 1907 |
| | | | | 13.3 | 730.3 | 0.90 | 73 | 11.5 | 633.5 | 0.79 | 13.3 | 1875 |

TABLE VIII

| | Composition | | | | |
|---|---|---|---|---|---|
| | 41* | 42 | 43 | 44 | 45 |
| additive composition (kg)[1] | 0 | 0.1 | 0.1 | 0.12 | 0.12 |
| cement (kg) | 10 | 10 | 10 | 12 | 12 |
| bag house dust (kg)[2] | 0 | 11.6 (A) | 11.6 (B) | 11.6 (B) | 11.6 (A) |
| blast furnace slag (19 mm) (I) | 38 | 38 | 38 | 38 | 38 |
| Water (I) | 4.8 | 4.8 | 4.8 | 4.8 | 4.8 |

*comparative composition
[1] additive composition A, milled to particles having a size of 2 mm or below
[2] between brackets is depicted the type of bag house dust

TABLE IX

| no | 2 days[1] | | 7 days[1] | | 14 days[1] | |
|---|---|---|---|---|---|---|
| | tensile | compression | tensile | compression | tensile | compression |
| 41* | 0 | 0 | 8.4 | 29.9 | 3.5 | 47.6 |
| 42 | 8.9 | 50.2 | 9.1 | 66.2 | 11.5 | 73.1 |
| 43 | 9.5 | 52.7 | 11.3 | 62 | 10.3 | 75.3 |
| 44 | 9.7 | 62 | 14.3 | 90.8 | 12.3 | 100+ |
| 45 | 8.9 | 59.7 | 12.7 | 85.9 | 15.2 | 100+ |

*comparative composition
[1] the concrete strength is depicted in MPa for both tensile and compression strength op mortar beams of 2, 7 and 14 days maturity.

TABLE X

| composition | initial chromium (VI)[1] | final chromium (VI) South-African method[2] | final chromium (VI) Dutch method[2] |
|---|---|---|---|
| 42 | 200000 | 821 (200) | <5 (500) |
| 43 | 922000 | 1210 (200) | <5 (500) |
| 44 | 922000 | 806 (200) | <5 (500) |
| 45 | 200000 | 732 (200) | <5 (500) |

* comparative examples
[1] chromium (VI) measured in ppb (parts per billion) concentration
[2] chromium (VI) measured in ppb (parts per billion) concentration, between brackets is depicted the acceptable risk limit of the respective country in ppb

The invention claimed is:

1. A binder composition comprising:
    a) an ash in an amount of 30.0-70.0 wt. %, based on a total weight of the binder composition;
    b) an additive composition in an amount of 0.1-5.0 wt. %, based on the total weight of the binder composition, wherein the additive composition comprises aluminum chloride and one or more components from group (b1), wherein group (b1) is selected from the group consisting of silica, zeolite and apatite, and wherein the aluminum chloride makes up 70.0-99.0 wt. % of a total weight of the aluminum chloride and (b1) and wherein the one or more components from group (b1) make up 1.0-30.0 wt. % of the total weight of the aluminum chloride and (b1); and
    c) a cement in an amount of 25.0-69.9 wt. %, based on the total weight of the binder composition.

2. The binder composition according to claim 1, wherein the amount of component a) is 50.0-60.0 wt. %.

3. The binder composition according to claim 1, wherein the ash of component a) has been selected from the group consisting of E-fly ash, E-bottom ash and a combination thereof.

4. The binder composition according to claim 1, wherein the amount of component b) is 0.5-1.0 wt. % of the total binder composition.

5. The binder composition according to claim 1, wherein component (b1) comprises a zeolite.

6. The binder composition according to claim 1, wherein the additive composition b) further comprises a metal chloride selected from the group consisting of sodium chloride, potassium chloride, magnesium chloride, calcium chloride, barium chloride, ammonium chloride, strontium chloride and combinations thereof.

7. The binder composition according to claim 1, wherein component b) further comprises one or more components from group b2), wherein group b2) is selected from the group consisting of magnesium oxide, calcium oxide and a combination thereof, and wherein said one or more components from group b2) make up 5-40 wt. % of the total weight of components aluminum chloride b1) and b2).

8. The binder composition according to claim 2, wherein the ash of component a) has been selected from the group consisting of E-fly ash, E-bottom ash and a combination thereof.

9. The binder composition according to claim 2, wherein the amount of component b) is 0.5-1.0 wt. % of the total binder composition.

10. The binder composition according to claim 3, wherein the amount of component b) is 0.5-1.0 wt. % of the total binder composition.

11. The binder composition according to claim 2, wherein component (b1) comprises a zeolite.

12. The binder composition according to claim 3, wherein component (b1) comprises a zeolite.

13. The binder composition according to claim 4, wherein component (b1) comprises a zeolite.

14. A binder composition comprising:
   a) an ash in an amount of 30.0-70.0 wt. %, based on a total weight of the binder composition;
   b) an additive composition in an amount of 0.1-5.0 wt. %, based on the total weight of the binder composition, wherein the additive composition comprises aluminum chloride and a zeolite, wherein the aluminum chloride makes up 70.0-99.0 wt. % of a total weight of the aluminum chloride and the zeolite, and the zeolite makes up 1.0-30.0 wt. % of the total weight of the aluminum chloride and the zeolite; and
   c) a cement in an amount of 25.0-69.9 wt. %, based on the total weight of the binder composition.

\* \* \* \* \*